June 26, 1923.
R. B. WHITMAN
WHEEL TIRE
Filed Oct. 4, 1920
1,460,187
2 Sheets-Sheet 2
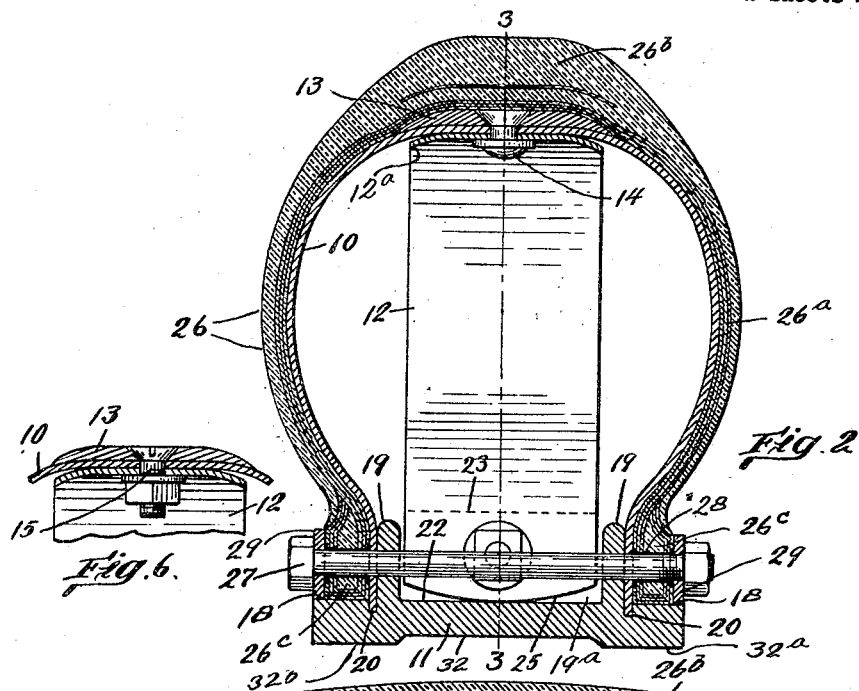
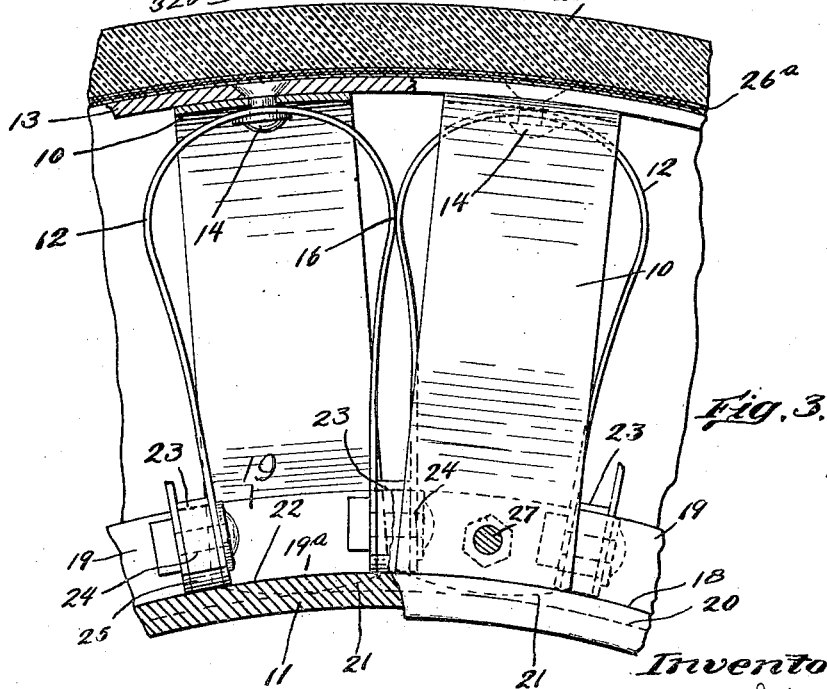

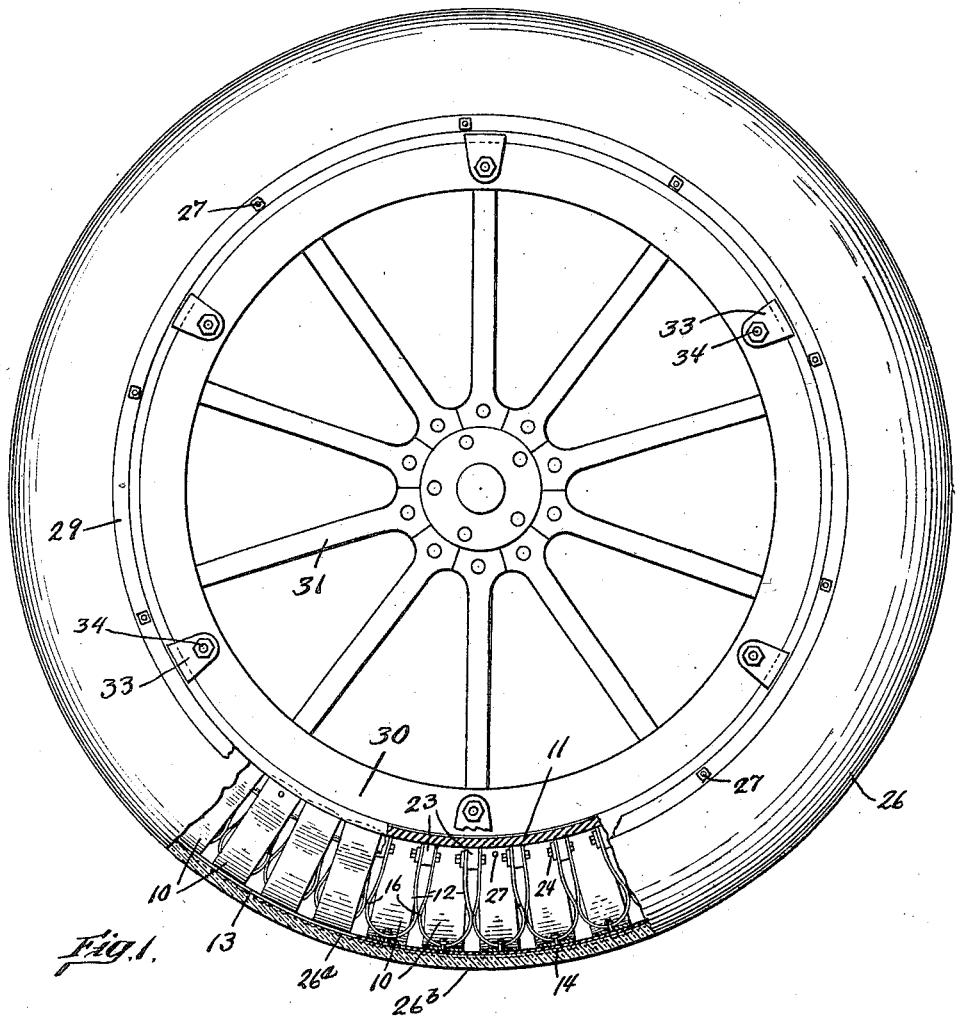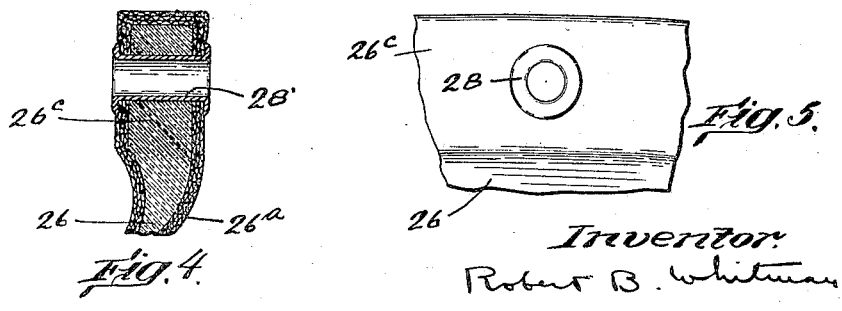

Patented June 26, 1923.

1,460,187

UNITED STATES PATENT OFFICE.

ROBERT B. WHITMAN, OF BOSTON, MASSACHUSETTS.

WHEEL TIRE.

Application filed October 4, 1920. Serial No. 414,418.

*To all whom it may concern:*

Be it known that I, ROBERT B. WHITMAN, a citizen of the United States, residing at Boston, in the county of Suffolk and State of Massachusetts, have invented an Improvement in Wheel Tires, of which the following is a specification.

This invention relates to wheel tires of the type comprehending the employment of resilient means, as contrasted with a pneumatic casing, to absorb road shocks; and has for objects the provision of a tire of the type set forth having a plurality of spring elements carried by the rim of the tire adapted to yield vertically under compression and also yield laterally when subjected to axially directed stresses; and also to yield in the plane of the tire when subjected to rotational or driving stresses.

A further object of the invention is the provision of a wheel tire having resilient elements arranged to be detachably mounted on the felly or rim of the wheel.

A yet further object of the invention is generally to improve the construction and operation of wheel tires of the type set forth.

Fig. 1 is a side elevation of a vehicle wheel with a tire embodying my invention detachably secured thereto, the tire casing being partially broken away to illustrate the spring construction.

Fig. 2 is a transverse sectional view of the tire.

Fig. 3 is an enlarged sectional detail of the tire taken along line 3—3 of Fig. 2.

Fig. 4 is a sectional detail of the bead of the tire casing illustrating the construction of the casing at this point and the arrangement for removably securing the casing to the rim of the tire.

Fig. 5 is a fragmentary side view of the part of the casing illustrated in Fig. 4.

Fig. 6 is a detail illustrating a modified means for detachably uniting the groups of springs and the connecting band.

As here shown, the tire embodying my invention includes the plurality of closely spaced loop-springs 10 radially disposed about the periphery of the rim 11 substantially at right angles to the plane of the rim, and a plurality of other loop-springs 12 radially disposed within said first spring 10 and arranged in the plane of the rim. Both sets of springs are adapted to yield under direct compression strains; and the springs 10 are adapted to yield under strains applied in the direction of the axis of the wheel, or rim, and the springs 12 are adapted to yield under strains acting more or less tangentially to the periphery of the tire, as driving strains in either a forward or reverse direction.

An endless flexible band 13 extends about said springs and said springs are secured to each other and to said band by the rivets 14. While the rivets may, in some instances hold the springs and the band tightly together, in other instances it will be desirable to permit a slight amount of relative movement between the two springs for the unrestricted action of one or the other sets of springs when subjected to forces other than those acting perpendicular to the tire. For this reason, also the top edge-portion 12$^a$ of said springs 12 is reflexed slightly downward to clear the outer springs 10 so that said springs 12 may be displaced laterally without interference with said springs 10. In some instances, it may be desirable to replace the rivets 14 by bolts 15, see Fig. 6, whereby individual springs may be repaired or replaced when injured or broken.

Said springs 12 are adapted to contact with each other at 16 whereby the flexing of one spring under load will cause the flexing of adjacent springs and thereby distribute the load to adjacent springs. With this arrangement, the springs may be considerably more flexible and have less weight than would otherwise be the case. Reduction of weight in a tire of this type is of importance. The band 13 which connects all springs also serves to distribute the load from the springs immediately adjacent the point of application of the load to more remote springs.

The two sets of springs 10 and 12 with the connecting band 13 and an enclosing casing hereinafter to be described are received on, and preferably removably secured to, the rim 11. The outer face of said rim is formed with the two flat ledges 18 extended inwardly from the edges of the rim and terminating at the circular ribs 19 which extend outwardly from the outer face of and peripherally about said rim. Grooves or channels 20 are formed in said rim at the junction of said ledges 18 and ribs 19 in which the ends of said springs 10 are removably received; and the ends of said springs are formed with the convex faces 21 permitting said springs to pivot or rock upon the bottom of said grooves 20 under the influence of driving forces. With this construction, the driving forces are mainly resisted by the springs 12.

The circular space between said two ribs 19 forms a recess $19^a$ in which the inner ends of said springs 12 are received, and the width of the recess is adapted to be but slightly greater than the width of the springs so that said springs will be retained in position when the tire is subjected to lateral forces.

Said springs 12 are adapted for transverse angular movement about their connections with the rim 11 when the tire is subjected to lateral stresses and as a means to provide for this movement, the ends of said springs may be arranged to pivot or rock upon the bottom face 22 of said recess. For this purpose, the ends of adjacent springs are secured together with rocking blocks 23 interposed therebetween. The securing means may comprise the rivets 24 as shown, or bolts not necessarily shown. With the latter construction, as previously set forth, individual spring substitutions may be made. Said rocking blocks 23 are formed with the convex faces 25 adapted to engage the bottom face 22 of said spring retaining recess $19^a$; and the bottom edges of said springs 12 are also formed with correspondingly curved edges which also may engage the bottom face of said recess. With the construction above set forth each set of springs may rock about its connection with the rim without substantial deformation and permit the other set of springs to yield under the particular forces acting upon the tire. With the construction above set forth, also, the spring-sets and the connecting band 13 may be assembled independently of the rim 11 and subsequently sprung into place on the rim, a construction which facilitates manufacture and assembly.

The enclosing casing 26 may be of the more or less common tubular form having the canvas body $26^a$ and the rubber tread $26^b$. As the casing will not be subjected to any great internal pressure, the canvas body may be reduced in thickness, or number of layers, over those at present used for pneumatic tires; and the tread $26^b$ may be made considerably thicker than those at present employed with pneumatic tires, as the life of the canvas body will be greater due to reduced internal pressure. The beads, or inner edges, $26^c$ of the casing preferably are formed of a harder rubber composition than that composing the tread; and when the casing is in position enclosing the spring sets, said beads or inner edges will rest upon said ledges 18.

The casing 26 and the spring sets are secured to said rim 11 at frequent intervals by the bolts 27 which are extended from side to side of the rim through eyelets 28 in the beads of the casing, see Figs. 4 and 5, and aligned openings in said ribs 19 and in certain of said springs 10; and the openings in said springs may be substantially greater than the diameter of the bolts. Rings 29 arranged on said rim on the outside of the casing between the beads of said casing and the heads and nuts of said bolts serve to distribute the clamping pressure more or less uniformly to the casing and the springs between said bolts.

It is not necessary to secure each spring 10 to the rim and it is preferable so to adjust the clamping pressure of said bolts 27 and the relative diameter of the bolts and bolt holes in the springs that the rocking movement of said springs 10 on the rim is not unduly restricted.

While the rim 11 may be an integral and permanent part of the felly 30 of the wheel 31, and the tire will thereby be permanently fixed to the wheel, I prefer to secure the tire detachably to the felly of the wheel thereby to permit tire substitutions, when desired, and also to admit of the application of the tire to existing wheels to replace pneumatic tires. For this purpose, the inner face 32 of the rim will be suitably formed to be received detachably upon the felly of the wheel, as by having the bearing portions $32^a$ and $32^b$, and will be detachably secured to the wheel by the clips 33 and bolts 34 as is more or less common practice.

I claim:

1. A wheel tire including a rim, two sets of open loop springs having their spaced ends supported by said rim and arranged substantially at right angles with each other, and an endless flexible band connecting the outer portions of said springs.

2. A wheel tire including a rim, two sets of loop springs having their ends connected with said rim for angular movement therewith and arranged substantially at right angles with each other, and an endless flexible band connecting the outer portions of said springs.

3. A wheel tire including a rim, a set of open loop springs disposed transverse the plane of the tire, a second set of open loop springs arranged within the springs of said first set and disposed in the plane of the tire, all springs having spaced-apart ends which engage said rim, and an endless flexible band enclosing both sets of springs and connecting their outer portions.

4. A wheel tire including a rim, two sets of radially-disposed, angularly-related loop springs having spaced-apart ends connected with said rim for angular movement therewith and an endless flexible band enclosing said sets of springs and connecting their outer portions.

5. A wheel tire including a rim, a plurality of loop springs radially extended transverse the plane of the rim having spaced-apart ends engaging said rim, a plurality of loop springs radially extended in the plane of the rim disposed beneath said first springs having spaced-apart ends in rocking engagement with said rim, and an endless band enclosing and connecting the outer portions of said springs.

6. A wheel tire including a rim, a set of spaced-apart loop springs radially extended transverse the plane of the rim having their ends engaging said rim, and a second set of loop springs radially extended in the plane of the rim having their loop-portions in engagement and their outer portions connected with the outer portion of said first set of springs and their ends in engagement with said rim.

7. A wheel tire including a rim, a set of spaced-apart loop springs radially extended transverse the plane of the rim having their ends engaging said rim, and a second set of loop springs radially extended in the plane of the rim having their loop-portions in engagement and their inner ends in rocking engagement with said rim.

8. A vehicle tire including a rim, a set of spaced-apart loop springs radially extended transverse the plane of the rim having their ends engaging said rim, a second set of loop springs radially extended in the plane of the rim having their loop-portions in engagement and their ends in engagement with said rim, and an endless flexible band enclosing said springs and connecting the outer portions of the springs of both sets.

9. A vehicle tire including a rim, a set of loop-springs radially extended transverse the plane of the rim, having their ends in engagement with said rim, a second set of loop springs radially extended in the plane of the rim and disposed within the first set, means connecting the outer-portions of corresponding springs together, and means connecting the adjacent ends of the springs of the second set together and rockingly connecting said connected ends with said rim.

10. A vehicle tire including a rim having opposed annular spring-receiving grooves in its outer face, a set of spaced open loop springs radially extended transverse the plane of said rim having their ends received in said grooves, and a second set of open loop springs disposed on the outer face of said rim radially extended in the plane of the rim having their ends disposed between said grooves.

11. A vehicle tire including a rim having opposed spring-receiving grooves in its outer face, and a set of spaced loop springs extended from the periphery of said rim having their ends rockingly received in the plane of and resiliently retained in said grooves.

12. A vehicle tire including a rim having opposed annular spring-receiving grooves in its outer face, a set of spaced open loop springs extended from the periphery of said rim having their ends received in said grooves, a second set of spaced open loop springs angularly disposed with relation to the springs of said first set, and having their ends in engagement with the periphery of said rim, and an outer flexible band enclosing and connecting the outer portions of both sets of springs.

13. A vehicle tire including a rim having opposed spring-receiving grooves in its outer face, a set of loop springs extended from the periphery of said rim having their ends received in said grooves, means connecting the outer portions of said loop springs and means pivotally connecting the inner ends of some of said loop springs with said rim.

14. A vehicle tire including a rim having opposed spring-receiving grooves in its outer face, a set of loop springs radially extended transverse the plane of said rim having their ends received and resiliently retained in said grooves, and a second set of loop springs radially extended in the plane of said rim within said first set having their ends rockingly engaging said rim between said grooves, and an endless band connecting the outer portions of said springs.

15. A wheel tire including a rim having two opposed circular spring receiving grooves in its periphery inset from its edges, circular ribs rising from the periphery of said rim at the inner edges of said grooves, a set of loop springs radially extended transverse the plane of the rim having their ends rockingly received in said grooves, a second set of loop springs radially extended in the plane of the rim disposed within said first set of springs having their adjacent ends connected together and in locking engagement with said rim between the ribs thereof, an endless flexible band enclosing said springs and connecting the outer portions thereof, a flexible casing enclosing said sets of springs and band having its beads in engagement with said rim beyond the spring receiving grooves therein, and means securing said casing to said rim.

16. A wheel tire including a rim, two sets of loop springs having their spaced ends in engagement with said rim and arranged substantially at right angles with each other, an endless flexible band connecting the outer portion of said springs, and a flexible casing enclosing said springs removably secured to said rim.

In testimony whereof, I have signed my name to this specification.

ROBERT B. WHITMAN.